United States Patent
Perreault et al.

(10) Patent No.: US 7,313,464 B1
(45) Date of Patent: Dec. 25, 2007

(54) BIN-PICKING SYSTEM FOR RANDOMLY POSITIONED OBJECTS

(75) Inventors: Louis Perreault, Québec (CA); Pierre Olivier, Saint-Rédempteur (CA)

(73) Assignee: Adept Technology Inc., Livermore, CA (US)

( * ) Notice: Subject to any disclaimer, the term of this patent is extended or adjusted under 35 U.S.C. 154(b) by 0 days.

(21) Appl. No.: 11/514,974

(22) Filed: Sep. 5, 2006

(51) Int. Cl.
*G06F 19/00* (2006.01)

(52) U.S. Cl. ............... 700/245; 700/245; 700/247; 700/248; 700/250; 700/251; 700/252; 700/253; 700/255; 700/257; 700/259; 700/261; 700/262; 700/264; 318/568.1; 318/568.11; 318/568.14; 318/568.16; 318/568.21; 901/4; 901/43; 901/47

(58) Field of Classification Search ............... 700/245, 700/247, 248, 250, 251, 252, 253, 254, 255, 700/257, 259, 260, 262, 264; 318/568.1, 318/568.11, 568.14, 568.16, 568.21, 568.23; 901/4, 43, 47
See application file for complete search history.

(56) References Cited

U.S. PATENT DOCUMENTS

| | | | | |
|---|---|---|---|---|
| 3,804,270 A | * | 4/1974 | Michaud et al. | 414/267 |
| 4,402,053 A | * | 8/1983 | Kelley et al. | 700/259 |
| 4,869,813 A | * | 9/1989 | Bailey et al. | 209/538 |
| 6,328,523 B1 | | 12/2001 | Watanabe et al. | |
| 6,721,444 B1 | | 4/2004 | Gu et al. | |
| 6,763,282 B2 | * | 7/2004 | Glenn et al. | 700/245 |
| 6,879,878 B2 | * | 4/2005 | Glenn et al. | 700/245 |
| 7,069,111 B2 | * | 6/2006 | Glenn et al. | 700/245 |
| 2006/0104788 A1 | | 5/2006 | Ban et al. | |

* cited by examiner

*Primary Examiner*—Thomas Black
*Assistant Examiner*—McDieunel Marc
(74) *Attorney, Agent, or Firm*—Ogilvy Renault, LLP

(57) ABSTRACT

A method for picking up objects randomly arranged in a bin using a robot having a gripper for grasping the objects using prehension feature(s) on the object. The method includes a shaking scheme for rearranging the objects in the bin when no objects are recognized, when no objects are prehensible by the gripper or when the object to be picked up is not reachable by the gripper because, for example, its prehension feature is substantially facing a wall of the bin. The method also includes a criterion for determining that a bin is free of objects to be picked up and a criterion for selecting the object to be picked up first in the bin. The method also provides for a protection mechanism against damage of the objects and the robot when a recognition technique has failed in properly recognizing the object or the prehension feature on the object.

21 Claims, 11 Drawing Sheets

FIG_1

BIN-PICKING SYSTEM FOR RANDOMLY POSITIONED OBJECTS

BACKGROUND OF THE INVENTION

1) Field of the Invention

The invention relates to the automated picking up of objects using a robot. More specifically, the invention relates to the automated picking up of objects which are randomly disposed in a bin.

2) Description of the Prior Art

In some industrial applications, in an assembling or packaging factory for example, it is required to recognize and pick up objects randomly arranged in a bin, a box or the like. The objects to be picked up may be mixed up in the bin with objects that are not useful at a given stage of the industrial process. A vision system is generally used to recognize the useful objects to be picked up and to determine their position in the bin to guide a robot which is used for grasping a selected object, to pick it up and place it in an arranged or predetermined position, such as in a shipping box for example. The bin-picking system first needs to select which object to pick up based on the information provided by the vision system.

Many picking up jobs are currently only doable by humans. One difficulty with the picking up of randomly arranged objects is that the objects may be piled up thus preventing the robot to reach some objects obstructed by other useful or unuseful overlapping objects in a given pile arrangement. The picking up system is required to recognize and select unobstructed objects but is prevented to do so by the overlapping objects.

If the objects to be picked up are disposed in a bin, a further difficulty results from the walls of the bin which may be mechanical obstacles in the reaching of an object by the robot. In some applications, the objects can only be grasped from one predetermined orientation relative to the object because the object is not symmetric and/or because it is required that the gripper of the robot grasps the object using specific features on the object, such as a hole, a post, etc. If the object is incorrectly oriented and/or close to the walls of the bin, the gripper, even if articulated to adjust its orientation, may not be able reach the object as it would hit the walls of the bin while moving to the object.

To circumvent those problems, the objects to be picked up are conventionally orderly arranged on a tray, a conveyer or a bin such that the objects are not piled up on one another and the objects to be picked up, such as bolts for example, are typically graspable from multiple orientations or properly oriented on the conveying surface, for example flat pieces are laid out on a conveyer. In some applications, objects graspable from multiple orientations are piled up on a tray but those systems do not encounter the problems associated with the use of a bin having walls.

SUMMARY OF THE INVENTION

It is an aim of the present invention to overcome at least some of the drawbacks of the prior art.

The invention provides a method for picking up objects randomly arranged in a bin using a robot having a gripper for grasping the objects using a prehension feature on the object. The method includes a shaking scheme for rearranging the objects in the bin when no objects are recognized, when no objects are prehensible by the gripper or when the object to be picked up is not reachable by the gripper because, for example, its prehension feature is substantially facing a wall of the bin. The method also includes a routine for determining that a bin is free of recognized objects to be picked up and a routine for selecting the object to be picked up first in the bin when more than one object could be picked up in the bin. The method also provides for a protection mechanism against damage of the objects and the robot when a recognition technique has failed in properly recognizing the object or the prehension feature on the object.

One aspect of the invention provides a method for picking up a selected object among at least one available object in a bin. The available object has a prehension feature adapted to allow a robot to pick up the available object. The robot is adapted to use the prehension feature on the available object to pick up the available object. The robot has an operable range in which it is able to pick up the available object. The method comprises: providing the bin at a bin location; acquiring an image of the at least one available object in the bin; obtaining information concerning a visibility of the prehension feature of the at least one available object using the image; identifying one of the at least one available object having the prehension feature visible on the image as a prehensible object; determining if the prehensible object is in a state to be picked up by the robot; if, among the at least one available object, a prehensible object is determined to be in a state to be picked up, picking up the prehensible object by the robot using position information obtained from the image; and if no prehensible object is determined to be in a state to be picked up, displacing and putting the bin back at the bin location and repeating the steps of acquiring, obtaining, identifying, determining and one of picking up and displacing, putting and repeating.

Another aspect of the invention provides a method for determining that a bin is free of recognized objects to be picked up by a robot. The robot is adapted to pick up an object. The bin has axes of motion about which the bin can be tilted. The method comprises: providing the bin at a bin position; obtaining axis information concerning previous tilting of the bin about the axes of motion; determining if the bin has been tilted about all of the axes of motion using the axis information; acquiring an image of the content of the bin; identifying recognized objects in the bin using the image; if no recognized object is identified and if the bin has been tilted about all of the axes of motion, determining that the bin is free of recognized objects to be picked up; and if no recognized object is visible and if the bin has not been tilted about all of the axes of motion, tilting the bin about a remaining one of the axes of motion, putting back the bin at the bin position and repeating the steps of determining, acquiring and determining.

A further aspect of the invention provides a method for selecting which object to pick up among at least one available object in a bin. The available object has a prehension feature adapted to allow a robot to pick up the available object. The robot is able to pick up the available object. The method comprises: acquiring a 3D image of the at least one available object in the bin; obtaining information concerning a visibility of the prehension feature of the at least one available object using the image; and selecting an available object to be picked up using the information concerning visibility of the prehension feature among the at least one available object.

Another aspect of the invention provides a method for picking up a selected object among at least one available object in a bin, the at least one available object having a prehension feature adapted to allow a robot to pick up the at least one available object, the robot being adapted to use the prehension feature on the at least one available object to pick up the at least one available object. The method comprises: providing the bin at a bin location; acquiring an image of the at least one available object in the bin; obtaining information concerning a visibility of the prehension feature of the at least one available object using the image; determining if the least one available object has the prehension feature visible on the image; if a selected object among the least one available object has the prehension feature visible on the image, picking up the selected object by the robot using position information obtained from the image; and if the least one available object has the prehension feature not visible on the image, displacing and putting the bin back at the bin location and repeating the steps of acquiring, obtaining, determining and one of picking up and displacing, putting and repeating. The displacing may comprise horizontally shaking the bin.

Another aspect of the invention provides a method for picking up a visible object among at least one available object in a bin, the object being adapted to be picked up by a robot. The method comprising: providing the bin at a bin location; acquiring an image of the at least one available object in the bin; identifying one of the available object being visible in the image as the visible object; moving the robot to reach and pick up the visible object; monitoring a force required by the robot while moving the robot; determining if the force is higher than a predetermined threshold force; if the force is not higher than a predetermined threshold force, picking up the visible object by the robot using position information obtained from the image; and if the force is higher than a predetermined threshold force, removing the robot from the bin, displacing and putting the bin back at the bin location and repeating the steps of acquiring, identifying, moving, monitoring, determining and one of picking up and removing, displacing, putting and repeating. The displacing may comprise tilting the bin.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
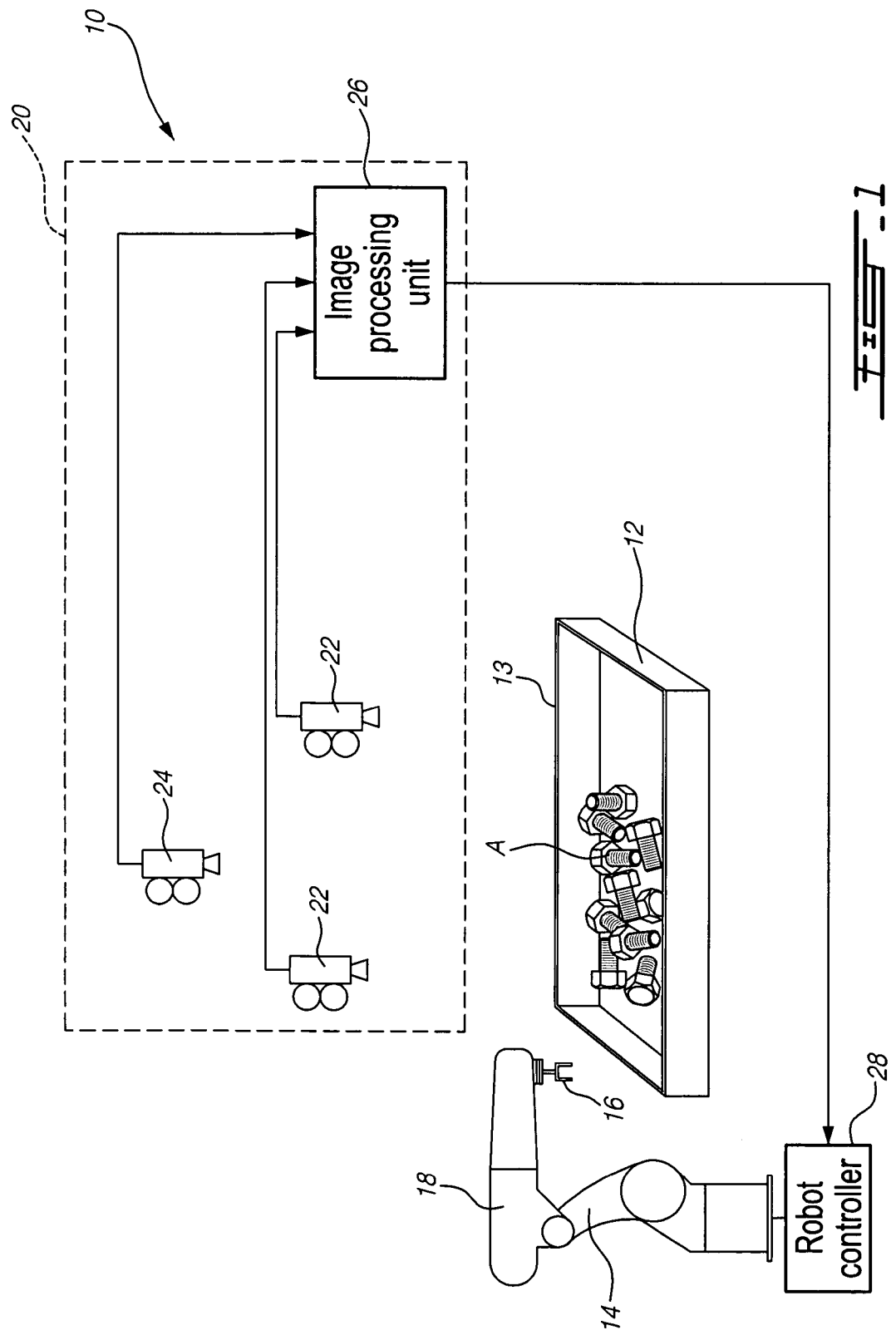
FIG. 1 is a schematic diagram illustrating a bin picking system wherein objects in a bin are to be picked up by a robot guided by a vision system.

Now referring to the drawings, FIG. 1 illustrates a bin-picking system 10 for picking up objects A in a bin 12 using a robot 14.

The bin 12 is similar to a tray but further has side walls 13 that can limit the reach of the objects A located near the walls 13 but that also minimizes the probability of an object to fall off the bin while the bin 12 is being displaced, i.e. lifted, tilted, shaken, and the like. A specially designed plastic bin can be used but the box used for the shipping of the objects, such as a carton, could also be used as a bin 12 if the lid is removed or the closing flaps are removed or held in an open position. The bin 12 is typically conveyed and stops at a predetermined bin position or location. The bin 12 can also be manually placed at an appropriate position, within the reach of the robot 14. A vision system 20 is used for recognizing the objects in the bin 12 and includes a bin positioning camera 24 for checking if the bin 12 is appropriately positioned for the picking up process within predetermined tolerances. If it is not the case, a conveyer (not shown) may be used to reposition the bin 12 or the robot 14 may lift the bin 12 and displace it as will be discussed later on. The bin 12 may also be manually displaced.

In the illustrated embodiment, the robot 14 is an articulated arm robot having a gripper 16 mounted on an articulated arm 18. It is noted that the robot of FIG. 1 is provided for illustration only and that, while in FIG. 1 the arm is shown having three parallel axes of movement, one skilled in the art will understand that a suitable articulated robot would typically have at least three differently arranged axis and the gripper 16 would be typically articulately mounted to the arm 18 with two or three additional axes of movement, depending on the application and the geometry of the objects to be picked up. Examples of suitable robots for bin-picking systems are articulated robots, Selective Compliant Articulated/Assembly Robot Arms (SCARA) and Cartesian coordinate robots.

The gripper 16 is adapted for the objects to be picked up and for the features on the objects that are used for grasping it with the gripper 16. Typically, a pneumatic hand gripper having two fingers can be used. Objects having a prehension feature in the shape of a hole can be picked up by inserting the robotized fingers inside the holes and opening the fingers to hold the object. Objects having a substantially flat surface can typically be grasped using a suction gripper. Other types of grippers can be used to grasp the objects, such as a single rod or plate, depending on the prehension feature of the object.

The robot will typically have an operable range within which it is able to pick up objects. This range will take into account the limits on the angle of each articulation of the robot and the volume occupied by the robot and the gripper and is used to determine whether it is possible to position the gripper at the appropriate angle and location to allow the robot to reach and grasp the object with the prehension feature. In the present case where the objects are placed in a bin, the object may be placed directly below the arm of the robot, but still be unreachable by the robot since the gripper cannot be rotated and lowered adequately to pick up the object without hitting the walls of the bin or another object.

In order to tilt and shake the bin 12 to rearrange the objects in the bin 12 when required (as will be discussed later on), the bin 12 can be adapted to be grasped by the robot using the gripper. If the gripper 16 is a pneumatic hand gripper, the gripper 16 can simply grasp one wall 13 of the bin 12 by closing the hand on the top of the wall 13. Alternatively, a specially adapted prehension feature can be attached to the walls 13 or the corners of the bin or defined with the walls 13 to allow the gripper 12 to grasp and lift one wall 13 or corner of the bin. The bin 12 can be adapted to be grasped or lifted by the gripper 16. For example, without being limitative, it can include features, such as holes defined in the walls 13, which are identified and grasped by the gripper 16. The bin 12 can alternatively be tilted and shaken using an actuated table on the top of which the bin 12 is placed. A tiltable conveyer may also be used for shaking the bin 12.

The bin-picking system 10 includes a vision system 20 for guiding the robot 14 in the picking up process. The vision system 20 includes two 3D imaging video cameras 22 provided above the bin 12 for acquiring 2D images of the objects in the bin 12. The 2D images are processed by an image processing unit 26 to provide a 3D image of the objects in the bin 12 using a stereoscopic method, for instance. The image processing unit 26 recognizes the objects A in the bin 12 by processing the 2D or 3D images. A model of the objects A to be picked up is provided to the image processing unit 26. The model includes a definition of the recognition features, e.g. describing the general shape of the object or a distinctive geometric shape or target on the object, and of a prehension feature, such as a hole in the object to be used by the gripper 16 to grasp it and that should be present on the object A. For example, if the objects to be picked up all have a distinct mark, such as a drawing or a special geometric shape at one end, it may only be required to recognize that distinct mark to recognize an object, the distinctive mark providing the recognition features. The image processing unit 26 identifies the objects A to be picked up in the bin by recognizing objects having the recognition features. The prehension feature is also recognized by the image processing unit 26 and is used to identify the objects that are prehensible by the gripper 16, as will be described later on.

A list of the recognized objects along with their position and orientation in the bin 12 is provided to a robot controller 28 that moves the arm 18 and the gripper 16 to reach one object A', grasp it and pick it up. Each object is picked up successively by the robot 14 and the object A' to be picked up at a given time among the objects in the bin 12 is selected by the robot controller 28. In selecting which object to pick up, the robot controller takes into account some further data provided by the image processing unit 26 along with the list, such as the position and an orientation axis of the prehension feature of the objects, and the visibility of the surface and the visibility of the prehension feature of the object A' as seen by the vision system 20 from above the bin 12. According to a first routine, the robot controller 28 verifies that the visibility of the surface is sufficient to conclude that there are no objects piled up over the object A' to be picked up and thus preventing the robot 14 to pick up the object A'. According to a second routine, the robot controller 28 also verifies that the prehension feature of the object A' is sufficiently visible to conclude that the prehension feature is sufficiently on the top of the object A' and free of overlapping objects to be grasped by the gripper. Finally and according to a third routine, the robot controller 28 evaluates if the prehension feature is reachable by the gripper 16, by checking if the prehension feature is substantially facing a wall 13 of the bin 12 to prevent the gripper 16 to reach it without hitting the wall 13. Those routines are provided as examples and more or less routines can by checked by the robot controller 28 to determine that an object can be picked up by the robot 14.

While in FIG. 1 the vision system is shown with two 3D imaging video cameras 18 along with an additional bin positioning camera 20, it should be appreciated that a 3D imaging video camera 18 could be alternatively used as a positioning camera 20. It is contemplated that the 3D imaging video cameras 22 could be replaced by digital cameras and that the 3D image could alternatively be acquired by a 3D camera. Any vision setup able to provide the list of visible objects can alternatively be used. For example, as it will be appreciated, increasing the number of video cameras 22 typically increases the robustness of the system.

Among the objects meeting the criteria, one object is selected by the robot controller 28 and is picked up by the robot 14. When there is no object meeting the criteria, objects in the bin 12 are rearranged according to the shaking scheme described in FIG. 2.

The method used by the robot controller 28 for picking up the objects in the bin 12 and including the shaking scheme used for rearranging the objects in the bin will be described in reference to FIG. 2. Some more basic routines that can be integrated into a different method, as an alternative to the method of FIG. 2, will also be described in reference to FIG. 9 to FIG. 13.

Figure 2:
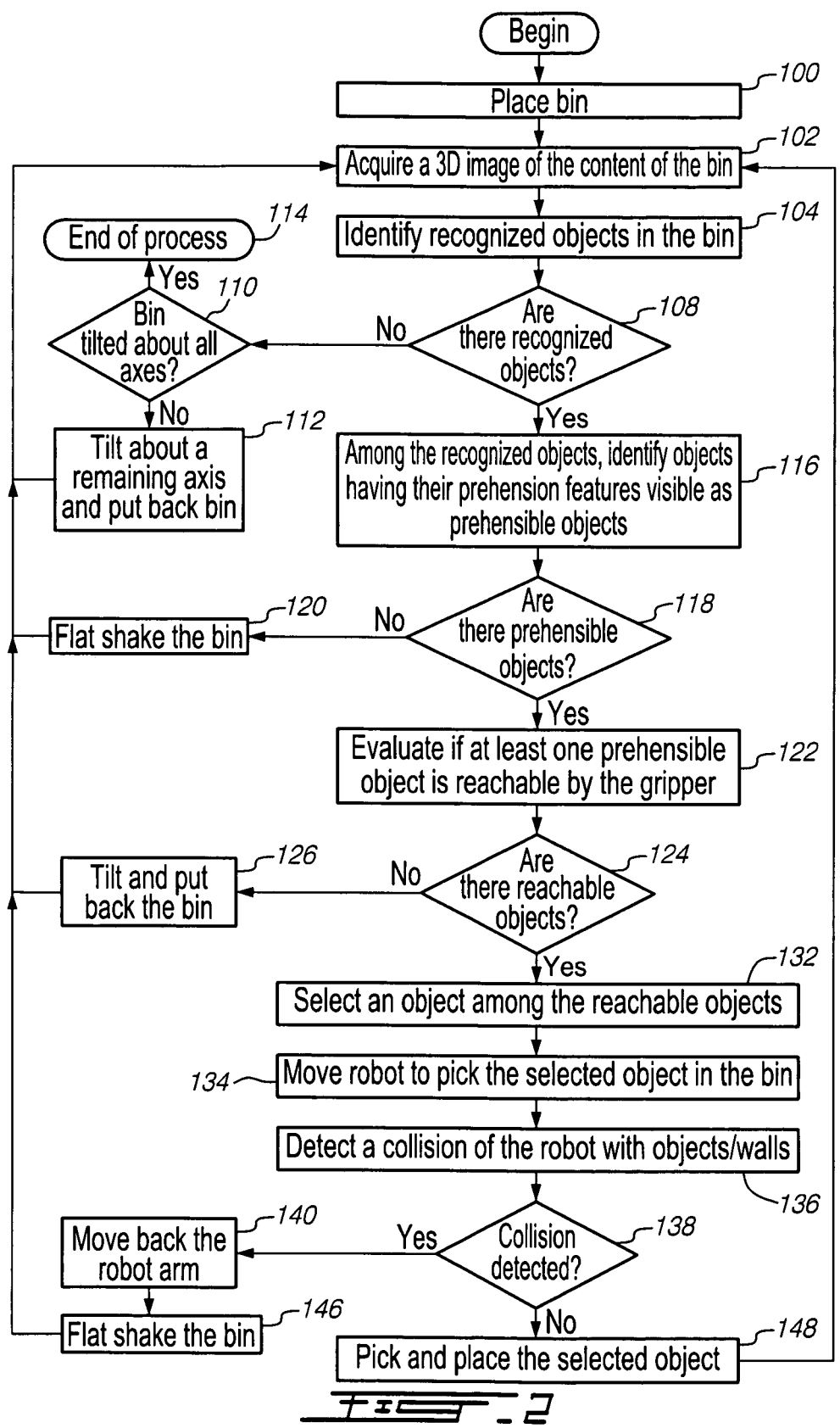
FIG. 2 is a flow chart illustrating a method for picking up objects in the bin using the robot.

While the method of FIG. 2 will be herein described in reference to the bin-picking system 10 of FIG. 1, it will be apparent that any alternative bin-picking system 10 could alternatively be used for implementing the method and that the steps described herein as being implemented by a given hardware component could alternatively be implemented by any other hardware components.

First, in step 100, the bin 12 is positioned at a predetermined bin position which is determined such that the contents of the bin is in the field of view of the vision system 20 and is in the field of reach of the robot 14. The positioning of the bin 12 may be assisted by the vision system 20 including the bin positioning camera 24. In step 102, a 3D image of the contents of the bin 12 is acquired using the vision system 20. For example, each of the two 3D imaging video cameras 22 provides a 2D image and a 3D image is provided using a stereoscopic method implemented by the image processing unit 26. In step 104, objects to be picked up that are visible on the images are identified by the image processing unit 26 and a list of recognized objects is provided. To be recognized by the vision system, an object must have a sufficient fraction of its recognition features visible from the top of the bin. Step 104 will be described in more details below in reference to FIG. 3.

In step 108, the robot controller 28 receives the list of recognized objects and checks whether there is any recognized object in the list. If there is no recognized object in the list, it may be that the bin 12 is free of objects to be picked up or that objects to be picked up, i.e. useful objects, in the bin are hidden by other objects that are not to be picked up by the robot, i.e. non useful objects. If a useful object is overlapped by other objects such that there is not a sufficient fraction of the surface of the object visible from the top of the bin, the object is not recognized by the vision system and it is not considered recognized. Consequently, if there is no recognized object, a routine is provided to verify if the bin is free of objects to be picked up and if the picking up should be stopped. In order to check if there is at least one remaining object to be picked up in the bin that might be hidden by other objects, the bin is first tilted, in step 112, about one axis of motion about which the bin 12 can be tilted. The position of the bin 12 is first checked using the vision system 20 and the robot 14 then grasps and slightly lifts one corner of the bin 12 in order to tilt the bin 12 and then shakes it. This process rearranges the objects in the bin 12 and may move away some non useful objects which were hiding some useful ones. Alternatively, one side wall 13 of the bin is grasped and lifted by the robot 14 to tilt and shake the bin 12 or the bin 12 is simply tilted using an actuated tilting table. If the robot 14 is to tilt the bin 12 by grasping and lifting one side wall 13 of the bin, the axes of motion will be the bottom edge of the bin opposite to the grasped side wall 13. A rectangular bin has four axes of motion, one for each side wall 13. If the bin 12 is placed on an actuated table, the axis of motion may be completely arbitrary. If the robot 14 is to tilt the bin 12 by grasping and lifting one side corner of the bin, the axis of motion may still be one bottom edge of the bin or the bin 12 may rotate about any axis on which lies the bottom corner opposite to the grasped corner. The axis of motion will depend on the direction of the lifting movement provided by the robot 14. The bin 12 can be simply tilted or can be slightly tilted and shaken in order to break the surface bonds between the objects.

The method then goes back to step 102 and consequently perform steps 104 and 108. If, in step 108, there is still no visible object, In step 112, the bin 12 is tilted about another axis of motion, i.e. another corner is grasped, lifted and shaken and the method goes back again to step 102. If at step 108 there is still no visible object in the bin 12 and if, at step 110, the bin has been tilted about all the axes, i.e. all the four corners of the bin 12 have been grasped and lifted and/or shaken in the embodiment of a rectangular bin, it is concluded that the bin 12 is free of objects to be picked up and the picking method ends at step 114. It is appreciated that if an object is recognized after tilting the bin about at least one axis of motion, the axis information concerning the prior tilting of the bin are reset, i.e. no prior tilting has occurred.

If, in step 108, there is at least one visible object in the bin, the method goes to step 116. In step 116, among the recognized objects, the objects having their prehension feature visible by the vision system are identified as prehensible objects. Accordingly, if the prehension feature is recognized on the images taken by the vision system 20, i.e. they are not hidden by other objects, it is considered that the gripper 16 will be able to grasp the prehension feature from the top of the bin. The criterion used for evaluating if the objects are prehensible can vary from embodiment to embodiment and according to the type of the objects to be picked up. According to one embodiment, there is a threshold on the ratio of the visibility of the prehension feature. For example, if the prehension feature is a hole in the object which the robot uses to grasp the object, the object may be considered prehensible if 90% of the edge of the hole is visible by the vision system 20. The 10% left may be unrecognizable on the image due to the image quality or may be overlapped by another object but the hole may still be prehensible by the gripper 16. In another example, the object may have more than one hole that can be individually used for grasping the object. It may than be required that at least one of the holes be visible. The prehension criteria, including the threshold(s), can vary in accordance with the nature of the objects.

In an alternative embodiment, if the prehensible features are located on the periphery of the objects, for example a bolt that is to be grasped by closing two fingers on its rod, the prehension criterion is different since the prehension feature is not only required to be visible but there should be sufficient space around the prehension feature to allow the gripper 16 to grasp the object. A volume enclosing the object is then defined in 3D for each recognized object in the bin. Based on the plurality of volumes, a prehensible object is a recognized object having its volume sufficiently free of all other volumes in order to allow the gripper to grasp the object. This method will be efficient in cases where there are no or few non useful objects in the bin since a volume is defined only for the objects recognized based on the geometry of the useful objects. Alternatively, without defining volumes enclosing the objects, it could be verified, using the 3D image, that the space around the prehension feature is sufficient.

In step 118, if there is no prehensible object, the robot 14 not being able to grasp any object, the bin is shaken in step 120 and the method goes back to step 102. In step 120, the bin is shaken horizontally on the conveyer. In one embodiment, the bin is shaken by the robot 14 which grasp one side wall 13 of the bin and translates it into a jerky back in forth motion. When the bin 12 is tilted or flat shaken by the robot 14, a prior check of the position of the bin 12 is performed. The horizontal shake can alternatively be provided by the conveyer. A suitable horizontal shake of the bin will typically disperse the objects that are piled up in the bin 12, thus hopefully showing some prehension feature.

If there is at least one prehensible object, it is evaluated, in step 122, if at least one prehensible object is reachable by the gripper, i.e. in a state to be picked up by the robot. An object is considered not reachable if the position and the orientation of its prehension feature is such that the gripper cannot reach the object because there is not sufficient free space adjacent to the prehension feature, defined as the clearance space of the prehension feature, to allow the gripper to reach the object. For example, if the object to be picked up is near a wall 13 of the bin and if the orientation of the prehension feature is such that the gripper 16 cannot grasp the object by reaching the object using a vertical movement but rather requires to follow a tilted path to reach and grasp the object, the operable range of the robot 14 may not allow the gripper 16 to reach the object as the robot 14 would hit the wall 13 of the bin in its path to reach the object. Two possible criteria for this evaluation are provided in FIG. 6 and FIG. 7 and will be described below.

In step 124, if there is no reachable object, the bin is tilted and typically shaken in step 126 before going back to step 102. The tilting axis is typically selected according to anyone of the objects that is prehensible but not reachable, but there will typically be few objects meeting these two conditions. The bin is tilted so that the selected object will hopefully rotate or translate such that its prehension feature will be facing further up or will rather slip in a direction opposite to the wall 13 obstructing the gripper 16. Typically, the wall 13 that is the nearest to the selected object is lifted and shaken.

Figure 4:
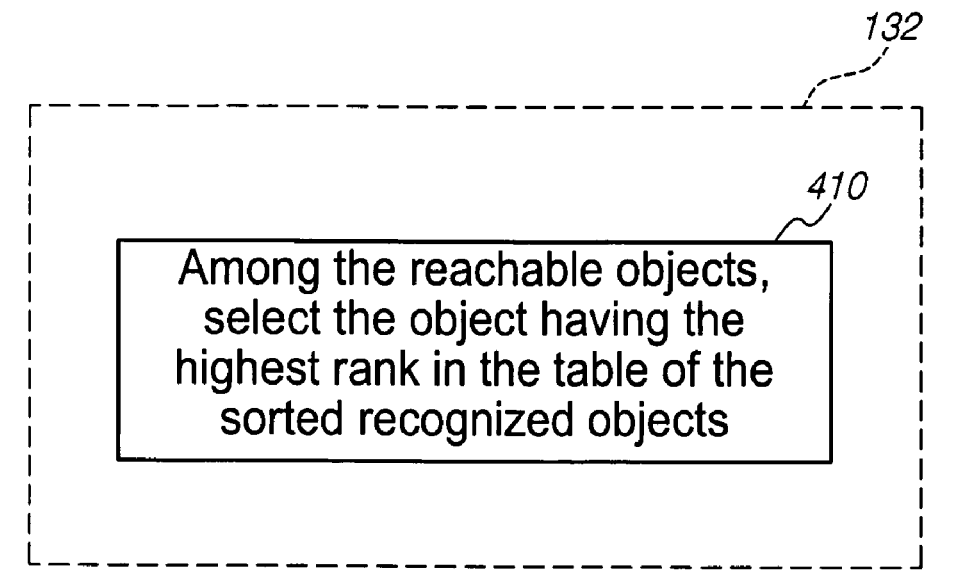
FIG. 4 is a flow chart illustrating a method for conducting the step of selecting an object among the reachable objects of the method of FIG. 2 wherein the object having the highest rank in a table is selected.
Figure 5:
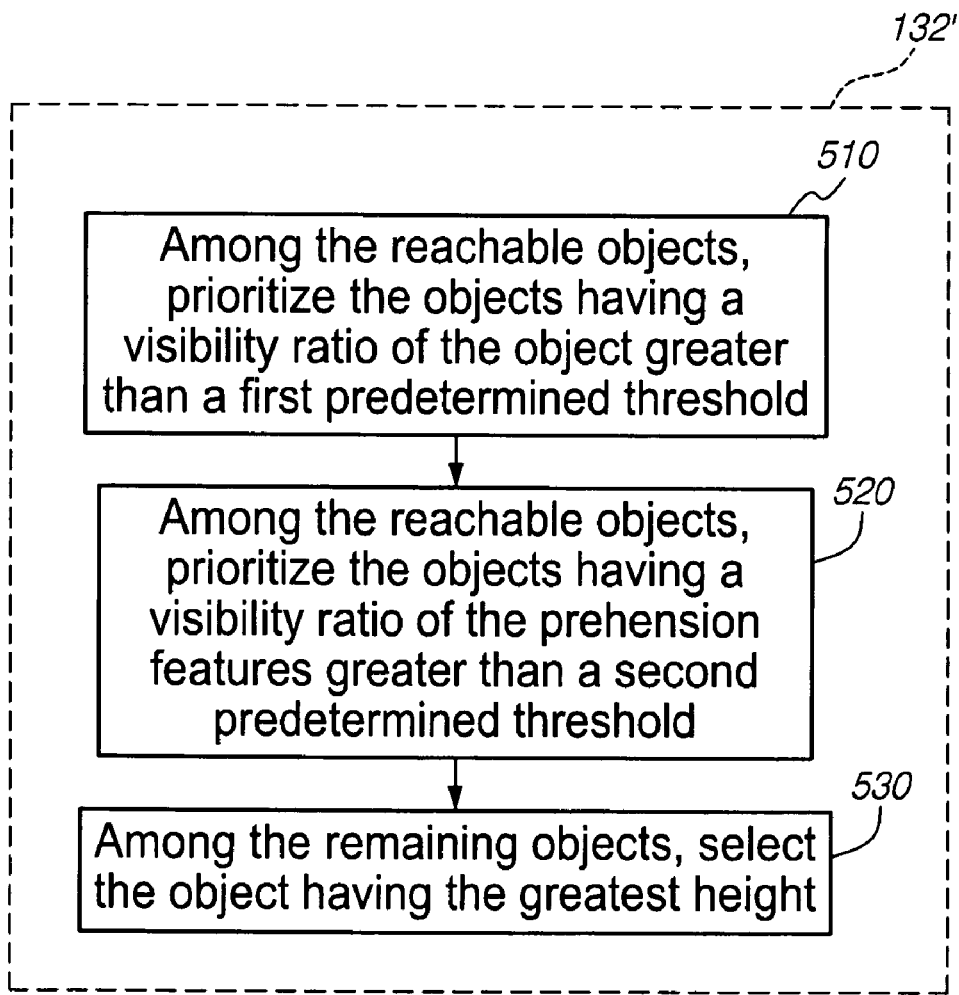
FIG. 5 is a flow chart illustrating a method for conducting the step of selecting an object among the reachable objects of the method of FIG. 2 wherein some objects are prioritized according to a criterion and the object having the greatest height in the bin is selected among the prioritized objects.

If there is at least one reachable object, one object among the reachable objects is selected to be picked up in step 132. In the case where there is more than one reachable object, two possible criteria for the selection of the object to be picked up first are shown in FIG. 4 and FIG. 5 and will be described below.

In step 134, the robot 14 is actuated to move and pick up the selected object in the bin. In step 136, as the robot moves, a potential collision between the robot 14 and any object in the bin or between the robot 14 and the walls 13 of the bin is detected. It provides for a protection mechanism against damage of the objects and the robot when, for example, a recognition technique has failed in properly recognizing the object or the prehension feature on the object. Because no vision system is perfect, detection of such a collision increases the reliability of the bin-picking system. For example, the prehension feature of an object A' may be slightly overlapped by another object but the object A' may still be identified as being prehensible (and further as being reachable) because the decision criteria for prehensible objects is based on a threshold on the ratio of visibility of the prehension feature. And then, as the robot 14 moves to reach and grasp the object, it may hit the overlapping object. The robot 14 should then stop its motion to prevent it from damaging the overlapping object or the gripper 16. In one embodiment, the collision detection is based on the detection of the mechanical force required by the robot 14 to move. In another embodiment, collision is detected using a vision method. For example, a 3D collision detection camera is mounted on the gripper for detecting the presence of an obstacle along the path of the robot 14.

In step 138, if a collision or an imminent collision is detected, the robot 14 is moved back, out of the bin 12, in 140. The bin position can then be checked to make sure that the bin 12 has not been displaced during the collision, and, in 146, the bin 12 is flat shaken to rearrange the objects in the bin 12 and possibly get the obstacle out of the way.

If no collision or imminent collision is detected, in step 148, the robot 14 picks up the selected object and places it out of the bin 12, in an appropriate location and arrangement for a given application of the bin-picking system. The method then goes back to step 102 to pick up more objects in the bin 12 if there are still more objects to be picked up.

It is noted that in the embodiment of FIG. 2, the image processing unit 26 and the robot controller 28 are distinct hardware units and that steps 102 and 104 are implemented by the image processing unit 26, while steps 108 to 148 are implemented by the robot controller 28 and the robot 14. Accordingly, the image processing should be all completed at step 104 and the result of the recognition should be provided to the robot controller 28, in a table for example, at the end of step 104. The table contains the 3D position coordinates and the orientation axis of the prehension feature of each recognized object, and the visibility of the surface and the visibility of the prehension feature of each visible object. This data is used by the robot controller 28 to check criteria and select the object A' to be picked up. In an alternative embodiment, the functions of the image processing unit 26 and of the robot controller 28 are implemented in a single central processing unit and the table provided at step 104 only includes a list of the visible objects with their 3D position coordinates and the visibility of the surface is calculated and the prehension feature is recognized later in the further steps of the method, only when the information is actually required for checking a criterion or for selecting the object to be picked up.

It is appreciated that any alternative displacement of the bin 12 which imparts displacement of the objects contained therein can be carried out in steps 112, 120, 126, and 146. Moreover, in an alternative embodiment, after having displaced the bin 12 for moving its content in steps 112, 120, 126 or 146, the position of the bin 12 can be checked (step 100) before acquiring a 3D image of the bin content.

Figure 3:
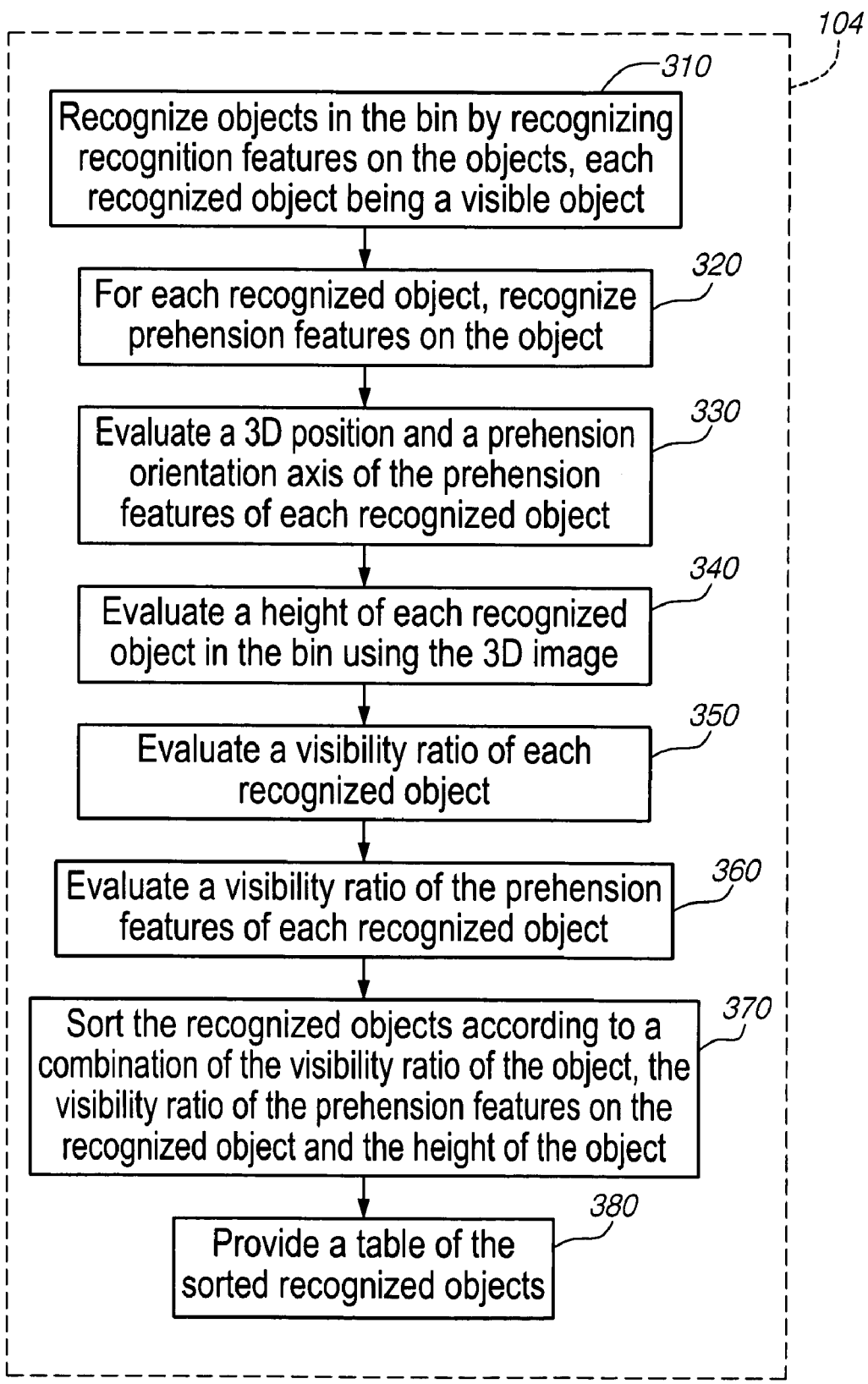
FIG. 3 is a flow chart illustrating a method for conducting the step of identifying recognized objects in the bin of the method of FIG. 2.

FIG. 3 illustrates a method for conducting the step 104 of identifying visible objects in the bin of the method of FIG. 2 according an embodiment wherein the image processing unit 26 and the robot controller 28 are distinct hardware. The method of FIG. 3 thus provides a sorted list of the recognized objects along with characteristics of the recognized objects obtained from the processing of the images and that are to be used by the robot controller in steps 108 to 148. In step 310, the image processing unit 26 recognizes objects to be picked up in the bin 12 in the 2D images acquired by the 3D imaging video cameras or in the 3D image. The objects are recognized by recognizing predetermined recognition features on the images. In step 320, the images are further processed for recognizing a prehension feature on each recognized object. In step 330, for each recognized object, the 3D position and the prehension orientation axis of the prehension feature is evaluated using the 3D image. The 3D position and the prehension orientation axis are used when moving the robot to grasp an object for orienting the gripper along the prehension orientation axis for proper grasping of the prehension feature.

In step 340, the height of each recognized object is evaluated using the 3D image. In step 350, the visibility ratio of each recognized object is evaluated. The visibility ratio is defined as the percentage of the surface facing upward that is visible from the vision system, i.e. the fraction of the surface of the object that is hidden under an overlapping object is not visible. In step 360, the visibility ratio of the prehension feature of each recognized object is evaluated. The visibility ratio of the prehension feature is the percentage of the surface of the prehension feature or the percentage of features that is visible from the vision system. This information can be used to determine if the prehension feature is sufficiently free of overlapping objects to be prehensible by the gripper (see step 116 of the method of FIG. 2). The height, the visibility ratio and the visibility of the prehension feature can be used, among others, to select the object to be picked up first when there is more than one reachable object, as will be described along with FIG. 4 and FIG. 5.

In step 370, the recognized objects are sorted according to a combination of the visibility ratio of the objects, the visibility ratio of the prehension feature on the objects and the height of the objects. Objects having a highest rank in the sort will be later prioritized over objects having a lower rank when selecting the object to be picked up among a plurality of reachable objects. In one embodiment, among the objects having a visibility ratio higher than a first predetermined ratio (80% for example) and having a ratio of the visibility of prehension feature higher than a second predetermined ratio (95% for example, which can be different from the ratio used in identifying prehensible objects in step 116 of the method of FIG. 2), the objects are sorted by their height in the bin 12. It is appreciated that an object higher in the bin 12 is more likely to be free of overlapping objects. Objects not meeting the predetermined ratios may remain at the bottom of the list and also be sorted according to their height.

In step 380, a table of the sorted objects and including the 3D position coordinates and the orientation axis of the prehension feature of each visible object, and the visibility of the surface and the visibility of the prehension feature of each visible object is provided to the robot controller 28.

FIG. 4 illustrates a method 132 for selecting an object among the reachable objects wherein the objects have been previously sorted according to the method of FIG. 3. In this case, the object having the highest rank in the table of the sorted objects is simply selected among the reachable objects.

An alternative method 132' for selecting the object to be picked up among the reachable objects is illustrated in FIG. 5. This method applies to a case wherein the objects have not been sorted in step 104 of the method of FIG. 2. In step 510, among the reachable objects, the objects having a visibility ratio of the object greater than a first predetermined threshold are prioritized. In step 520, among the reachable objects, the objects having a visibility ratio of the prehension feature of the object greater than a second predetermined threshold are also prioritized. In step 530, among the prioritized objects, the object having the greatest height is selected. If no objects have been prioritized, the reachable object having the greatest height is selected.

Figure 6:
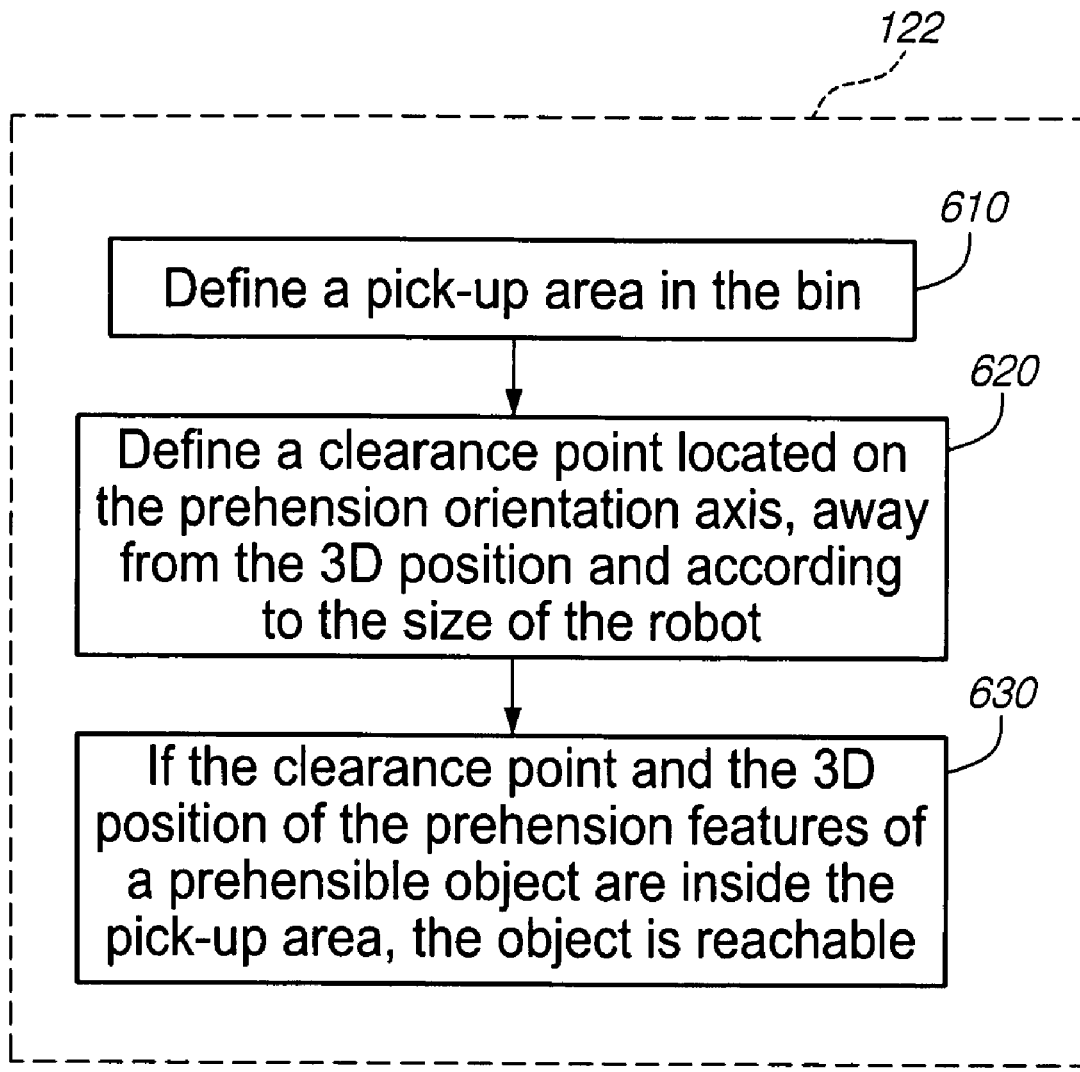
FIG. 6 is a flow chart illustrating a method for conducting the step of evaluating if at least one prehensible object is reachable by a gripper of the method of FIG. 2 wherein an object is reachable if the gripper is not to hit a wall of the bin while reaching the object to be picked up.
Figure 7:
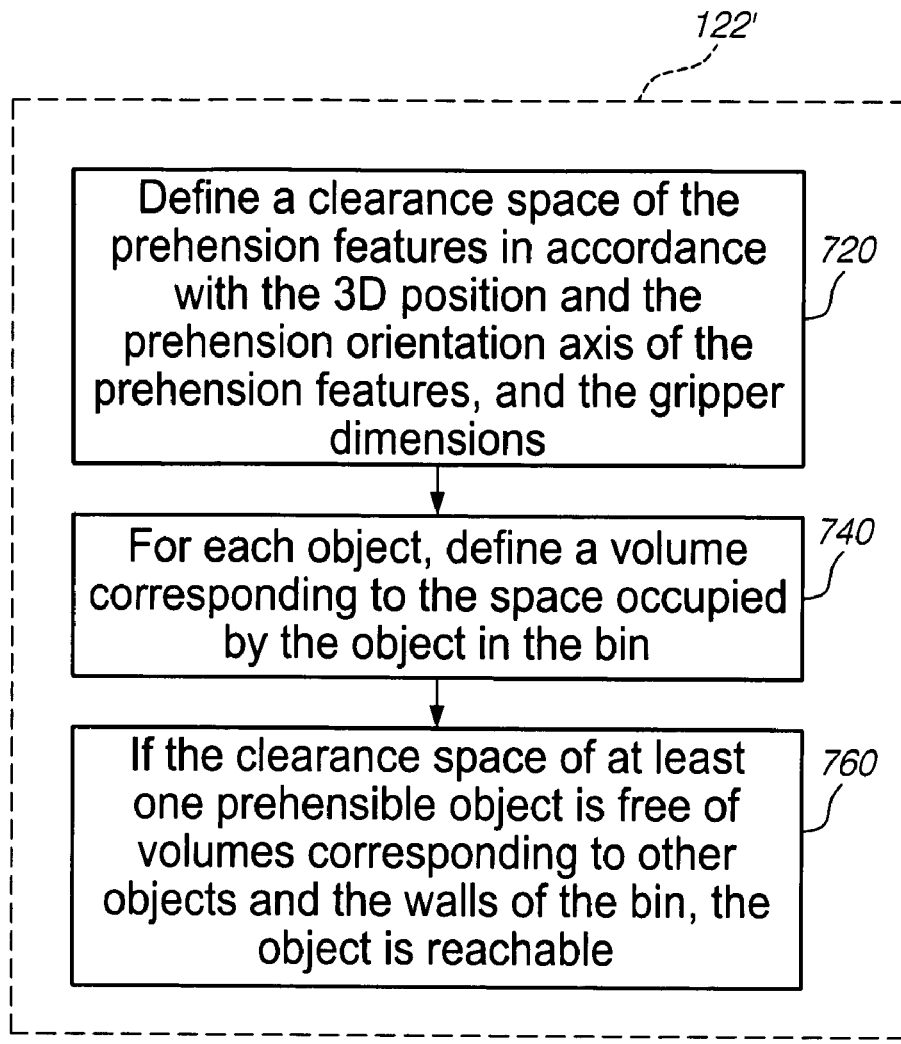
FIG. 7 is a flow chart illustrating a method for conducting the step of evaluating if at least one prehensible object is reachable by the gripper of the method of FIG. 2 wherein an object is reachable if the gripper is to hit neither the walls of the bin nor other objects in the bin while reaching the object to be picked up.

FIG. 6 and FIG. 7 show two possible criteria to evaluate if a prehensible object is reachable by the gripper. According to the method of FIG. 6, an object is reachable if the gripper is not to hit a wall of the bin while reaching the object to be picked up. According the method of FIG. 7, an object is reachable if the gripper is to hit neither the walls of the bin nor other objects In the bin while reaching the object to be picked up.

Now referring to FIG. 6, there is provided a criterion 122 for evaluating if a prehensible object is reachable by the gripper. First, prehensible features located very close to a wall 13 of the bin may not be reachable by the gripper as the gripper has a given operable range and requires a given space to move about and position itself to grasp the object. It is thus required that the prehensible features be located within a given pick-up area which is defined inside the walls 13 of the bin. Accordingly, in step 610, a pick-up area is defined within the bin. If the prehension feature of the prehensible object A' is within this pick-up area and if the prehension feature faces up such that the gripper 16 can reach the object A' by approaching vertically, the prehensible objects are reachable by the gripper. This pick-up area is typically defined by the operable range of the robot 14, particularly the width of the gripper 16. However, if the prehension feature is not facing up, the object may not be graspable if the prehension feature is oriented toward a wall 13 of the bin. Accordingly, in step 620, a clearance point located on the prehension orientation axis, away from the 3D position of the prehension feature and according to the operable range of the robot is defined. The clearance point defines the 3D position of the articulation between the gripper 16 and the arm 18 of the robot as the gripper is to grasp the prehension feature. This articulation is used to tilt the gripper in order to reach objects that are in a slanted position in the bin. In step 640, the object is reachable if the clearance point and the position of the prehension feature of a prehensible object are both inside the pick-up area. In this condition, if the object is slanted, the tilted gripper does not the hit the walls 13 of the bin to reach the prehensible features.

Now referring to FIG. 7, there is provided an alternative criterion 122' for evaluating if a prehensible object is reachable by the gripper 16. This criterion takes into account the dimensions of the gripper, the walls 13 of the bin and, in contrast to the criterion shown in FIG. 6, it also takes the location of the other objects in the bin 12 into account. In step 720, a clearance space of the prehension feature in accordance with the 3D position and the prehension orientation axis of the prehension feature and the gripper dimensions is defined. The clearance space corresponds to the space required adjacent to the prehension feature for the gripper 16 to reach it and typically has the dimensions of the gripper 16, including the articulation joining it to the arm 18. In step 740, a volume corresponding to the space occupied by the object in the bin in defined for each object. In step 760, if the clearance space of at least one prehensible object is free of volumes corresponding to other objects and the walls 13 of the bin, the object is reachable by the gripper 16.

Figure 8:
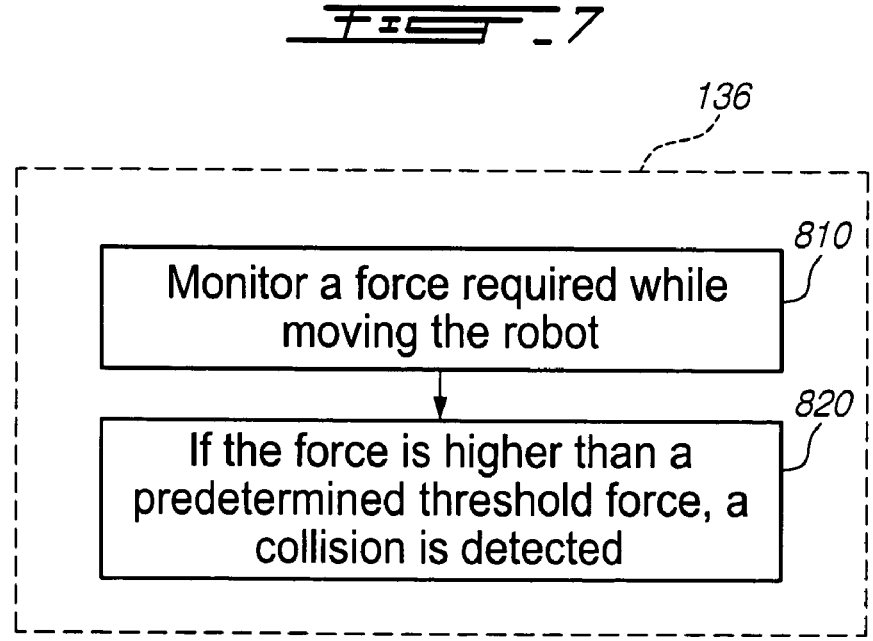
FIG. 8 is a flow chart illustrating a method for conducting the step of detecting a collision of the robot of the method of FIG. 2.

FIG. 8 illustrates a method for conducting the step 136 of detecting a collision of the robot in the method of FIG. 2. According to this method, as the robot 14 moves, the mechanical force required by the robot 14 is monitored in step 810 in order to detect a collision of the robot 14 with objects in the bin or with the walls 13 of the bin. In step 820, if the force required by the mechanical actuators of the robot arm 18 or the gripper 16 is higher than a predetermined threshold force, a collision is detected. For example, collisions may be detected by limiting the electrical current driving each actuator of the robot 14 to a predetermined current amplitude limit. If the amplitude of the current reaches the current amplitude limit, a collision is detected. In an alternative embodiment, the force is monitored by a force or pressure sensor provided on the robot 14.

Figure 9:
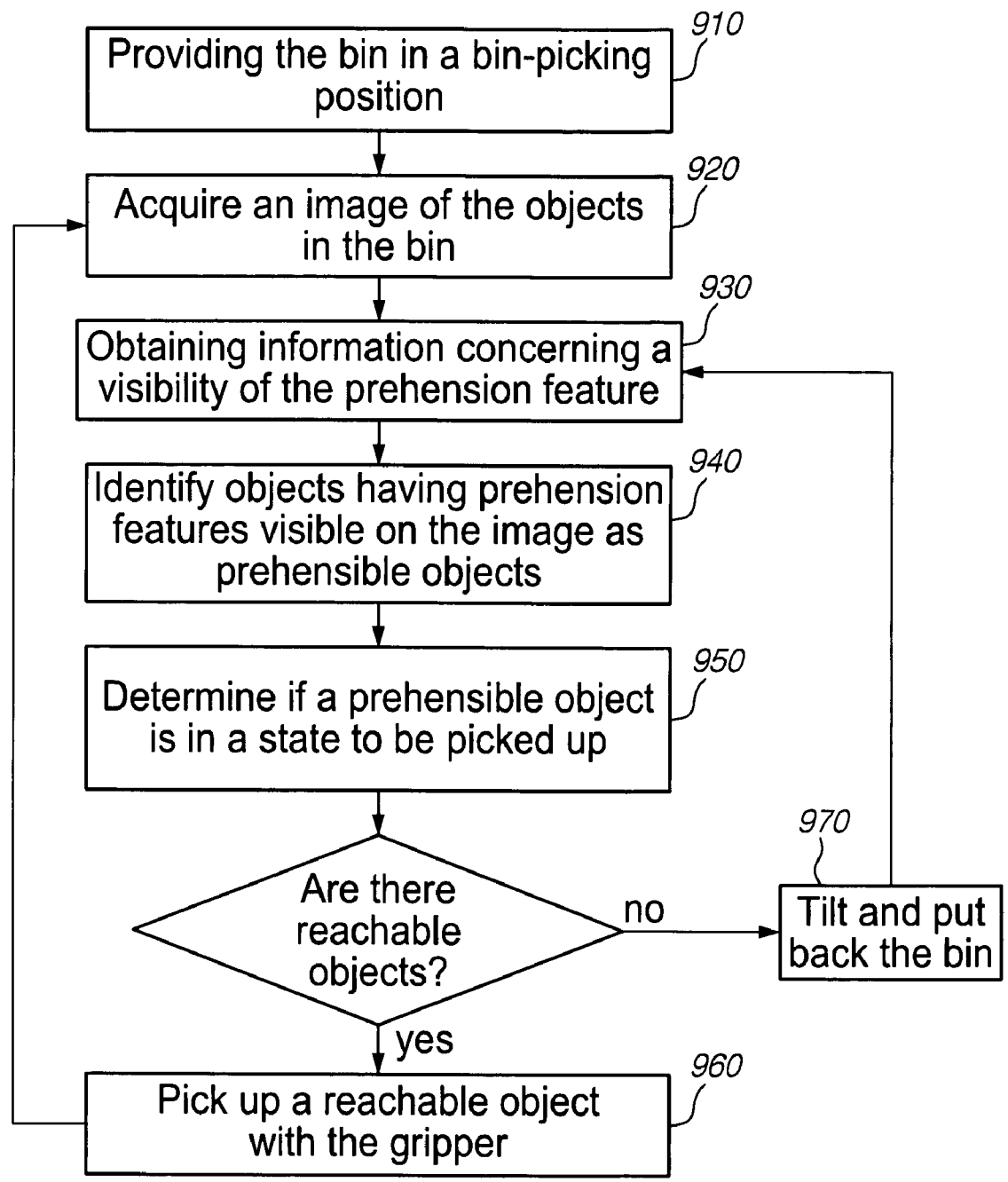
FIG. 9 is a flow chart illustrating a method for picking up objects in the bin using a robot wherein the bin is tilted if there is no object reachable by the gripper.

FIG. 9 illustrates a method for picking up objects in a bin using a robot according to an embodiment wherein the bin is tilted if there is no object reachable by the gripper. The method includes: step 910 of providing the bin at a bin location; step 920 of acquiring an image of the objects in the bin; step 930 of obtaining information concerning a visibility of the prehension feature of objects using the image; step 940 of identifying objects having prehension feature visible on the image as prehensible objects; step 950 of determining if the prehensible objects are in a state to be picked up by the robot; step 960 of, if, among objects, a prehensible object is determined to be in a state to be picked up, picking up the prehensible object by the robot; and step 970 of, if no prehensible object is determined to be in a state to be picked up, tilting and putting the bin back at the bin location and repeating the steps of acquiring, obtaining, identifying, determining and one of picking up and tilting, putting and repeating. In an embodiment, step 950 is carried out using the position of the prehension feature, the prehension orientation axis of the prehension feature and/or the size characteristic of the robot, wherein the position and the prehension orientation axis are obtained from the image.

Figure 10:
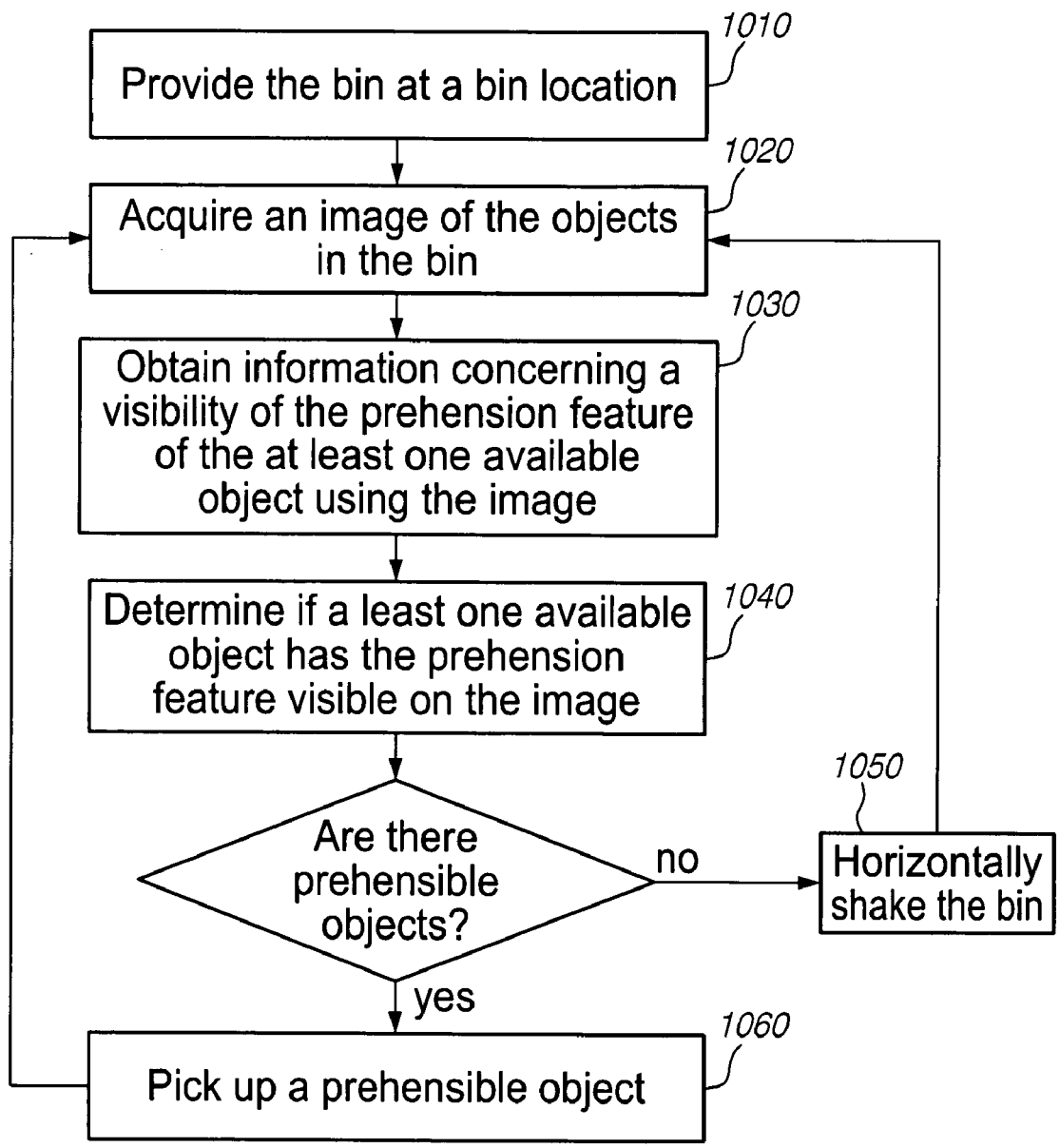
FIG. 10 is a flow chart illustrating a method for picking up objects in the bin using the robot wherein the bin is horizontally shaken if the objects overlap such that no object is prehensible.

FIG. 10 illustrates a method for picking up objects in a bin using a robot according to an embodiment wherein the bin is horizontally shaken if the objects overlap such that there is no prehensible object, i.e. the prehension feature is not visible. The method includes: step 1010 of providing the bin at a bin location; step 1020 of acquiring an image of the at least one available object in the bin; step 1030 of obtaining information concerning a visibility of the prehension feature of the at least one available object using the image; step 1040 of determining if the least one available object has the prehension feature visible on the image; step 1060 of, if a selected object among the least one available object has the prehension feature visible on the image, picking up the selected object by the robot using position information obtained from the image; and, step 1050 of, if the least one available object has the prehension feature not visible on the image, displacing and putting the bin back at the bin location and repeating the steps of acquiring, obtaining, determining and one of picking up and displacing, putting and repeating. An object is defined as available if it includes the prehension feature.

Figure 11:
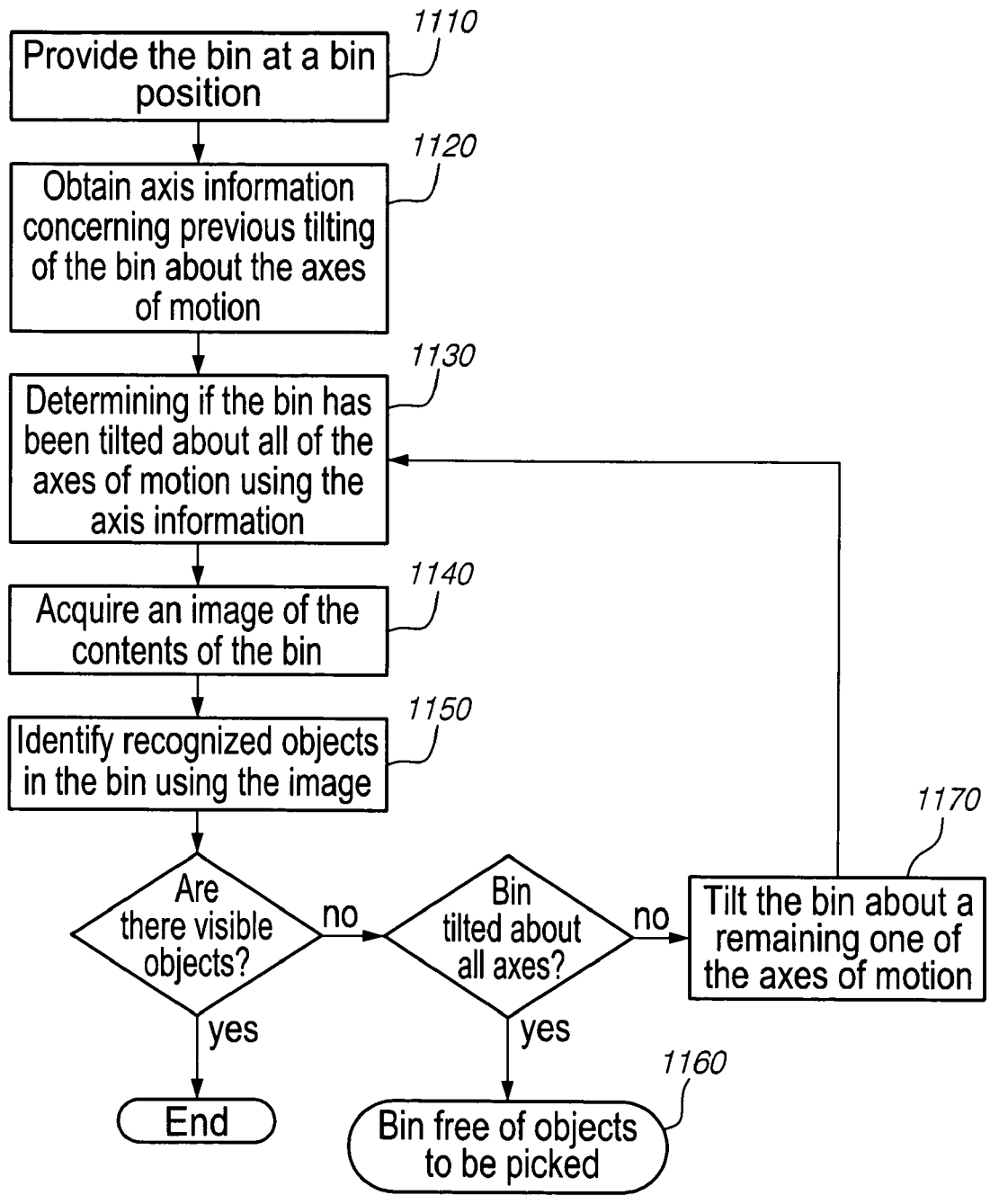
FIG. 11 is a flow chart illustrating a method for determining that the bin is free of objects to be picked up by a robot.

FIG. 11 illustrates a method for determining that a bin is free of objects to be picked up by a robot according to an embodiment. The method includes: step 1110 of providing the bin at a bin position; step 1120 of obtaining axis information concerning previous tilting of the bin about the axes of motion; step 1130 of determining if the bin has been tilted about all of the axes of motion using the axis information; step 1140 of acquiring an image of the content of the bin; step 1150 of identifying recognized objects in the bin using the image; step 1160 of, if no recognized object is identified and if the bin has been tilted about all of the axes of motion, determining that the bin is free of recognized objects to be picked up; and step 1170 of, if no recognized object is visible and if the bin has not been tilted about all of the axes of motion, tilting the bin about a remaining one of the axes of motion, putting back the bin at the bin position and repeating the steps of determining, acquiring and determining.

Figure 12:
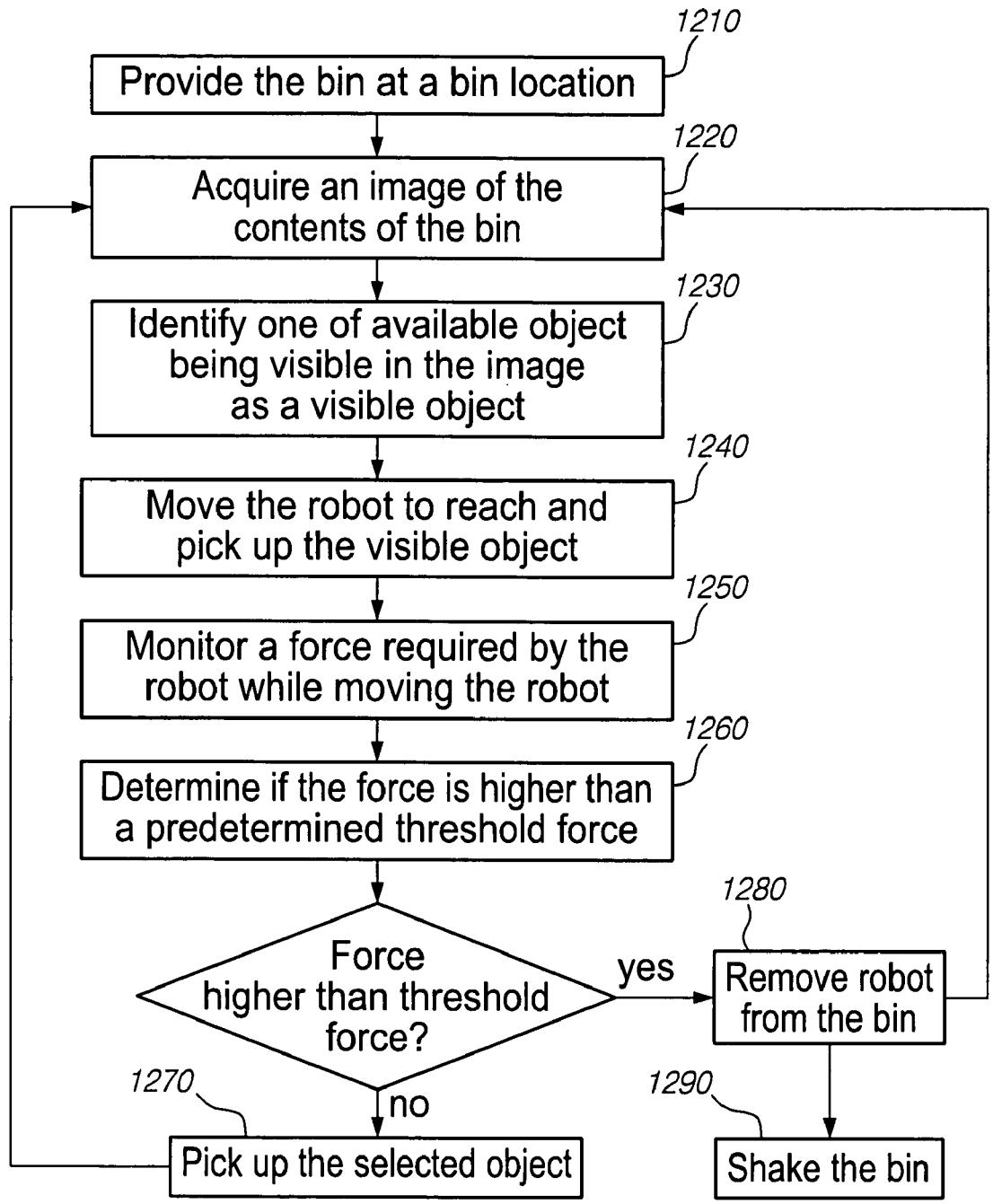
FIG. 12 is a flow chart illustrating a method for picking up objects in a bin using a robot wherein a collision of the robot with objects or walls of the bin is detected to prevent damage of the objects or the robot.

FIG. 12 illustrates a method for picking up objects in a bin using a robot according to an embodiment wherein a collision of the robot with objects or walls of the bin is detected to prevent damage of the objects or the robot. The method includes: step 1210 of providing the bin at a bin location; step 1220 of acquiring an image of the at least one available object in the bin; step 1230 of identifying one of the available object being visible in the image as a visible object; step 1240 of moving the robot to reach and pick up the visible object; step 1250 of monitoring a force required by the robot while moving the robot; step 1260 of determining if the force is higher than a predetermined threshold force; step 1270 of, if the force is not higher than a predetermined threshold force, picking up the visible object by the robot using position information obtained from the image; step 1280 of, if the force is higher than a predetermined threshold force, removing the robot from the bin, and step 1290 of displacing and putting the bin back at the bin location and repeating the steps of acquiring, identifying, moving, monitoring, determining and one of picking up and removing, displacing, putting and repeating.

Figure 13:
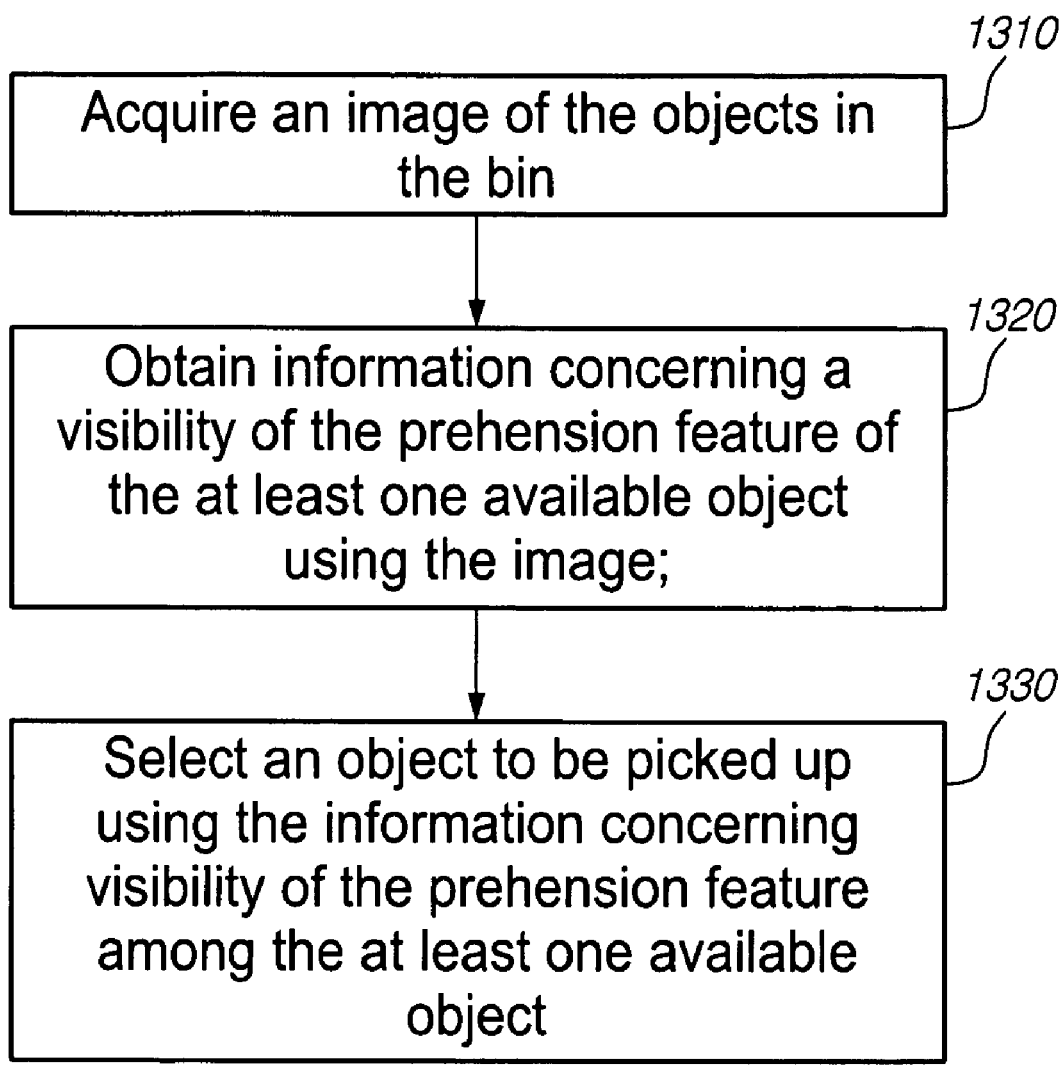
FIG. 13 is a flow chart illustrating a method for selecting which object to pick up first in the bin.

FIG. 13 illustrates a method for selecting which object to pick up first in a bin according to an embodiment. The method includes: step 1310 of acquiring a 3D image of the at least one available object in the bin; step 1320 of obtaining information concerning a visibility of the prehension feature of the at least one available object using the image; and step 1330 of selecting an object to be picked up using the information concerning visibility of the prehension feature among the at least one available object.

In the methods described above in reference to FIGS. 9 to 12, it is appreciated that any alternative displacement of the bin 12 which imparts displacement of the objects contained therein can be carried out. Moreover, in an alternative embodiment, after having displaced the bin 12 for moving its content, the position of the bin 12 can be checked before acquiring a 3D image of the bin content.

While illustrated in the block diagrams as groups of discrete components communicating with each other via distinct data signal connections, it will be understood by those skilled in the art that the embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

The embodiments of the invention described above are intended to be exemplary only. For example, other criteria than the sufficient fraction of the recognition feature and/or the prehension feature visible can be used to identify an objected as either recognized or prehensible. Moreover, the threshold used as the sufficient fraction can vary. The nature and the preponderance of the criteria in the table to sort the recognized objects can vary. Similarly, the nature and the preponderance of the criteria used in the methods for selecting the object to be picked up among the reachable objects and/or evaluating if a prehensible object is reachable by the gripper can vary. The position information of an object can include, without being limitative, its 3D position, its prehension orientation axis, its clearance point, etc. The scope of the invention is therefore intended to be limited solely by the scope of the appended claims.

What is claimed is:

1. A method for picking up a selected object among at least one available object in a bin, said available object having a prehension feature adapted to allow a robot to pick up said available object, said robot being adapted to use said prehension feature on said available object to pick up said available object, said robot having an operable range, said robot being able to pick up said available object within said operable range, the method comprising:

providing said bin at a bin location;

acquiring an image of said at least one available object in said bin;

obtaining information concerning a visibility of said prehension feature of said at least one available object using said image;

identifying one of said available object having said prehension feature visible on said image as a prehensible object;

determining if said prehensible object is in a state to be picked up by said robot;

if, among said at least one available object, a prehensible object is determined to be in a state to be picked up, picking up said prehensible object by said robot using position information obtained from said image; and if no prehensible object is determined to be in a state to be picked up, displacing and putting said bin back at said bin location and repeating said steps of acquiring, obtaining, identifying, determining and one of picking up and displacing, putting and repeating.

2. The method as claimed in claim 1, wherein said displacing comprises tilting said bin.

3. The method as claimed in claim 2, wherein said tilting comprises picking up and lifting at least one of a corner and a wall of said bin by said robot.

4. The method as claimed in claim 3, wherein said tilting further comprises shaking said at least one of a corner and a wall of said bin using said robot.

5. The method as claimed in claim 2, wherein said bin has axes of motion about which said bin can be tilted, wherein said tilting is about one of axes of motion, said method further comprises:

storing axis information concerning said tilting;

determining if said bin has been tilted about all of said axes of motion using said axis information;

if no available object is identified as a prehensible object and if said bin has not been tilted about all of said axes of motion, tilting said bin about a remaining one of said axes of motion, putting back said bin in said bin position and repeating said steps of acquiring, identifying, determining and one of picking up and tilting, putting and repeating;

if no available object is identified as a prehensible object and if said bin has been tilted about all of said axes of motion, identifying said bin as being free of available objects to be picked up.

6. The method as claimed in claim 5, said method further comprises:

if at least one object is identified as a prehensible object, resetting said axis information concerning said tilting.

7. The method as claimed in claim 1, wherein said picking up said prehensible object comprises: moving at least a portion of said robot to reach and pick up the prehensible object using said position information, monitoring a force required to pick up said prehensible object and, if said force is higher than a predetermined threshold force, moving at least a portion of said robot out of said bin, at least one of tilting and shaking said bin and repeating said steps of acquiring, identifying, determining and one of picking up and displacing, putting and repeating.

8. The method as claimed in claim 1, wherein the step of determining is carried out using said position information of said prehension feature and said operable range.

9. The method as claimed in claim 1, further comprising a step of verifying if said bin contains at least one available object using said image and wherein said steps of acquiring, obtaining, identifying, determining and one of picking up and displacing, putting and repeating are repeated until no available object is present in said bin.

10. The method as claimed in claim 1, wherein said image is a three dimensional image.

11. The method as claimed in claim 1, further comprising:

obtaining a prehension orientation axis of said prehension feature from said image;

defining a pick-up area within said bin using said operable range;

wherein said determining comprises:

determining if said prehensible object is in a state to be picked up by said robot using said position information, said pick-up area definition and said prehension orientation axis, wherein said prehensible object is in a state to be picked up by said robot if said prehension feature is positioned within said pick-up area definition and said prehension orientation axis is within said operable range;

if, among said at least one available object, a prehensible object is determined to be in a state to be picked up, picking up said prehensible object by said robot using said position information and said prehension orientation axis.

12. The method as claimed in claim 11, further comprising:

defining a clearance point located on said prehension orientation axis, away from said position, using said operable range;

determining if said prehensible object is in a state to be picked up by said robot using said position information, said pick-up area definition, said prehension orientation axis and said clearance point, wherein said prehensible object is in a state to be picked up by said robot if said prehension feature and said clearance point are positioned within said pick-up area.

13. The method as claimed in claim 11, wherein said pick-up area is a surface defined at a predetermined distance from walls of the bin.

14. The method as claimed in claim 1, further comprising:

if no prehensible object is identified, tilting and shaking said bin and repeating said steps of acquiring, obtaining, identifying, determining and one of picking up and tilting and shaking, putting and repeating.

15. The method as claimed in claim 1, wherein said image is a 3D image and wherein said picking up comprises:

determining a height in said bin for each of said prehensible objects in said state to be picked up by said robot;

selecting the selected object among said prehensible objects in said state to be picked up by said robot using said height and picking up said selected object by said robot using said position information.

16. A method for determining that a bin is free of recognized objects to be picked up by a robot, said robot being adapted to pick up an object, wherein said bin has axes of motion about which said bin can be tilted, the method comprising:

providing said bin at a bin position;

obtaining axis information concerning previous tilting of said bin about said axes of motion;

determining if said bin has been tilted about all of said axes of motion using said axis information;

acquiring an image of the content of said bin;

identifying recognized objects in said bin using said image;

if no recognized object is identified and if said bin has been tilted about all of said axes of motion, determining that said bin is free of recognized objects to be picked up; and if no recognized object is visible and if said bin has not been tilted about all of said axes of motion, tilting said bin about a remaining one of said axes of motion, putting back said bin at said bin position and repeating said steps of determining, acquiring and determining.

17. The method as claimed in claim 16, wherein said object has a recognition feature, further comprising:

identifying an object as recognized in said image using said recognition feature.

18. The method as claimed in claim 16, the method further comprising:

if at least one recognized object is identified, resetting said axis information.

19. A method for selecting which object to pick up among at least one available object in a bin, said available object having a prehension feature adapted to allow a robot to pick up said available object, said robot being able to pick up said available object, the method comprising:

acquiring a 3D image of said at least one available object in said bin;

obtaining information concerning a visibility of said prehension feature of said at least one available object using said image; and selecting an object to be picked up using said information concerning visibility of said prehension feature among said at least one available object;

determining if said prehensible object is in a state to be picked up by said robot; if, among said at least one available object, a prehensible object is determined to be in a state to be picked up, picking up said prehensible object by said robot using position information obtained from said image; and if no prehensible object is determined to be in a state to be picked up, displacing and putting said bin back at said bin location and repeating said steps of acquiring, obtaining, identifying, determining and one of picking up and displacing, putting and repeating.

20. The method as claimed in claim 19, the method further comprising:

determining height information concerning a height in said bin for each available object using said image, wherein said selecting use said height information.

21. The method as claimed in claim 19, wherein said object has a recognition feature, further comprising:

obtaining information concerning a visibility of said recognition feature of said at least one available object using said image; wherein said selecting uses said visibility information of said recognition feature.

* * * * *